(12) United States Patent
Ohura et al.

(10) Patent No.: US 12,366,392 B2
(45) Date of Patent: Jul. 22, 2025

(54) REFRIGERANT CYCLE SYSTEM AND METHOD

(71) Applicant: DAIKIN INDUSTRIES, LTD., Osaka (JP)

(72) Inventors: Ryuuta Ohura, Osaka (JP); Takuya Kotani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 902 days.

(21) Appl. No.: 17/436,379

(22) PCT Filed: Mar. 4, 2020

(86) PCT No.: PCT/JP2020/009202
§ 371 (c)(1),
(2) Date: Sep. 3, 2021

(87) PCT Pub. No.: WO2020/179825
PCT Pub. Date: Sep. 10, 2020

(65) Prior Publication Data
US 2022/0146158 A1 May 12, 2022

(30) Foreign Application Priority Data
Mar. 4, 2019 (JP) .................. 2019-038568

(51) Int. Cl.
*B23P 6/00* (2006.01)
*F25B 41/24* (2021.01)
(Continued)

(52) U.S. Cl.
CPC .............. *F25B 41/24* (2021.01); *F25B 41/40* (2021.01); *F25B 49/005* (2013.01); *B23P 6/00* (2013.01);
(Continued)

(58) Field of Classification Search
CPC ..... F25B 2500/06; F25B 2500/22; B23P 6/00
See application file for complete search history.

(56) References Cited

U.S. PATENT DOCUMENTS

| | | |
|---|---|---|
| 7,606,683 B2 | 10/2009 | Bahel et al. |
| 9,933,205 B2 | 4/2018 | Hatomura et al. |

(Continued)

FOREIGN PATENT DOCUMENTS

| | | |
|---|---|---|
| EP | 3467406 A1 | 4/2019 |
| EP | 3764008 A1 | 1/2021 |

(Continued)

OTHER PUBLICATIONS

International Search Report issued in corresponding International Application No. PCT/JP2020/009202, mailed Apr. 14, 2020, with translation (4 pages).

(Continued)

*Primary Examiner* — Christopher J. Besler
(74) *Attorney, Agent, or Firm* — Osha Bergman Watanabe & Burton LLP

(57) ABSTRACT

An air conditioning apparatus includes utilization-side units each including a first refrigerant circuit, a heat source-side unit including a second refrigerant circuit, a connection pipe group, and a relay unit. The relay unit is disposed between the first refrigerant circuit and the second refrigerant circuit, and blocks a flammable refrigerant flowing through the connection pipe group. The utilization-side units are disposed in a utilization-side unit group that is a group of two or more utilization-side units. The relay unit blocks a flow of the refrigerant between the first refrigerant circuit and the second refrigerant circuit. The connection pipe group connects the first refrigerant circuit and the refrigerant shut-off unit. The connection pipe group has one or both of a length (Continued)

and an internal volume, which is fixed based on information on capabilities of the two utilization-side units.

5 Claims, 11 Drawing Sheets

(51) Int. Cl.
  *F25B 41/40* (2021.01)
  *F25B 49/00* (2006.01)
(52) U.S. Cl.
  CPC ... *B23P 2700/09* (2013.01); *F25B 2313/0233* (2013.01); *F25B 2400/12* (2013.01); *F25B 2500/22* (2013.01); *F25B 2500/222* (2013.01)

(56) References Cited

U.S. PATENT DOCUMENTS

| | | |
|---|---|---|
| 2005/0165591 A1 | 7/2005 | Bahel et al. |
| 2014/0033754 A1 | 2/2014 | Hatomura et al. |
| 2018/0003419 A1* | 1/2018 | Ohura ............... F25B 31/002 |
| 2018/0180338 A1 | 6/2018 | Honda et al. |

FOREIGN PATENT DOCUMENTS

| | | |
|---|---|---|
| JP | H11-63745 A | 3/1999 |
| JP | 2017-009267 A | 1/2017 |
| JP | 2018-077040 A | 5/2018 |
| JP | 6632760 B1 | 1/2020 |
| WO | 2017/203606 A1 | 11/2017 |

OTHER PUBLICATIONS

International Search Report issued in corresponding International Application No. PCT/JP2020/009204, mailed Apr. 14, 2020, with translation (5 pages).
International Preliminary Report on Patentability issued in corresponding International Application No. PCT/JP2020/009202, mailed on Sep. 16, 2021 (11 pages).
Extended European search report issued in corresponding European Patent Application No. 20765508.5 dated Oct. 18, 2022 (8 pages).
English translation of International Preliminary Report on Patentability issued in related International Application No. PCT/JP2020/009204 mailed Sep. 16, 2021 (12 pages).
Extended European search report issued in related European Patent Application No. 20766726.2 dated Oct. 14, 2022 (9 pages).

* cited by examiner

| TOTAL VALUE OF CAPACITIES OF UTILIZATION-SIDE UNITS DOWNSTREAM OF RELAY UNIT (TOTAL CAPACITY) | RESTRICTION ON TOTAL VALUE OF LENGTHS OF PIPES IN CONNECTION PIPE GROUP DOWNSTREAM OF RELAY UNIT |
|---|---|
| 14~18kW | 30 m OR LESS |
| 13~14kW | 35 m OR LESS |
| 11~13kW | 40 m OR LESS |
| 10~11kW | 80 m OR LESS |
| 9~10kW | 95 m OR LESS |
| 8~9 kW | 100 m OR LESS |
| 6~8 kW | 105 m OR LESS |
| ~6 kW | 135 m OR LESS |

FIG. 4

| COMBINATION PATTERN NO. | UTILIZATION-SIDE UNIT 1 | UTILIZATION-SIDE UNIT 2 | UTILIZATION-SIDE UNIT 3 | UTILIZATION-SIDE UNIT 4 | UTILIZATION-SIDE UNIT 5 | TOTAL VALUE OF CAPACITIES (TOTAL CAPACITY) | RESTRICTION ON TOTAL VALUE OF LENGTHS OF PIPES IN CONNECTION PIPE GROUP |
|---|---|---|---|---|---|---|---|
| | kW | kW | kW | kW | kW | kW | m |
| 1 | 2.2 | 2.2 | | | | 4.4 | 140 |
| 2 | 2.8 | 2.2 | | | | 5.0 | 140 |
| ⋮ | ⋮ | ⋮ | ⋮ | ⋮ | ⋮ | ⋮ | ⋮ |
| 11 | 3.6 | 3.6 | 2.2 | | | 9.4 | 100 |
| ⋮ | ⋮ | ⋮ | ⋮ | ⋮ | ⋮ | ⋮ | ⋮ |
| 21 | 2.2 | 2.2 | 2.2 | 2.2 | | 8.8 | 95 |
| ⋮ | ⋮ | ⋮ | ⋮ | ⋮ | ⋮ | ⋮ | ⋮ |
| 41 | 7.1 | 4.5 | | | | 11.6 | 245 |
| ⋮ | ⋮ | ⋮ | ⋮ | ⋮ | ⋮ | ⋮ | ⋮ |
| 51 | 7.1 | 2.2 | 2.2 | 2.2 | | 13.7 | 40 |
| ⋮ | ⋮ | ⋮ | ⋮ | ⋮ | ⋮ | ⋮ | ⋮ |

FIG. 5

REFRIGERANT CYCLE SYSTEM AND METHOD

TECHNICAL FIELD

The present disclosure relates to a refrigerant cycle system and a method for fixing one of or both a length and an internal volume of a first connection pipe group in the refrigerant cycle system.

BACKGROUND

Patent Literature 1 discloses an air conditioning system including a refrigerant shut-off valve. The refrigerant shut-off valve is closed when leakage of a refrigerant is detected. The refrigerant shut-off valve is disposed on a refrigerant connection pipe connecting a heat source-side unit and a utilization-side unit.

PATENT LITERATURE

Patent Literature 1: JP 2017-009267 A

In a refrigerant cycle system such as an air conditioning system, the use of a shut-off valve is effective in case of occurrence of leakage of a refrigerant from a utilization-side unit into a space where someone is present.

However, heretofore, an idea of blocking a refrigerant at a location as close as possible to a utilization-side unit has become a common-sense approach, and no specific consideration has been given to arrangement of a shut-off unit for blocking the refrigerant. No consideration has been given to arrangement of a shut-off unit particularly in a refrigerant cycle system including a common shut-off unit for a plurality of utilization-side units.

SUMMARY

One or more embodiments of the invention provide a method for fixing (determining) one of or both a length and an internal volume of a first connection pipe group in a refrigerant cycle system. The refrigerant cycle system includes a plurality of utilization-side units, a heat source-side unit, a connection pipe group, and a refrigerant shut-off unit. Each of the utilization-side units includes a first refrigerant circuit. The heat source-side unit includes a second refrigerant circuit. The connection pipe group connects the first refrigerant circuit and the second refrigerant circuit. The refrigerant shut-off unit is disposed between the first refrigerant circuit and the second refrigerant circuit, and is configured to block (shut off) a refrigerant flowing through the connection pipe group. The refrigerant flowing through the first refrigerant circuit, the second refrigerant circuit, and the connection pipe group has flammability. The plurality of utilization-side units include a first utilization-side unit group. The first utilization-side unit group is a group of N (N: an integer equal to or more than two) utilization-side units. The refrigerant shut-off unit includes a first refrigerant shut-off unit. The first refrigerant shut-off unit is configured to block a flow of the refrigerant between the first refrigerant circuit in the first utilization-side unit group and the second refrigerant circuit. The connection pipe group includes the first connection pipe group. The first connection pipe group connects the first refrigerant circuit in the first utilization-side unit group and the first refrigerant shut-off unit. The method according to one or more embodiments includes a first step, a second step, and a third step. The first step involves acquiring information on capabilities of the N utilization-side units in the first utilization-side unit group. The second step involves finding (calculating) an allowable maximum value of one of or both the length and the internal volume of the first connection pipe group, based on the information acquired in the first step. The third step involves fixing one of or both the length and the internal volume of the first connection pipe group, the length and internal volume falling below the allowable maximum value found in the second step.

With regard to arrangement of the first refrigerant shut-off unit, heretofore, it has been proposed to employ an idea of bringing the first refrigerant shut-off unit close to the first utilization-side unit group as much as possible. In contrast, the method according to one or more embodiments fixes, for example, the length and the like (one of or both the length and the internal volume) of the first connection pipe group relevant to the arrangement of the shut-off valve, based on the information on the capabilities of the N utilization-side units in the first utilization-side unit group.

If leakage of the refrigerant occurs at anywhere in the first utilization-side unit group due to damage, after the closing of the first refrigerant shut-off unit, a sum of the refrigerant in the first utilization-side unit and the refrigerant in the first connection pipe group is a maximum amount of the refrigerant leaking from the first utilization-side unit group. In view of this, the method according to one or more embodiments finds the allowable maximum value, based on the information on the capabilities of the N utilization-side units in the first utilization-side unit group, and fixes, for example, the length and the like (one of or both the length and the internal volume) of the first connection pipe group, the length falling below the allowable maximum value. This configuration improves the degree of freedom as to the arrangement of the first refrigerant shut-off unit as compared with a conventional configuration.

According to one or more embodiments, the refrigerant flowing through the first refrigerant circuit, the second refrigerant circuit, and the connection pipe group is a mildly flammable refrigerant, a lower flammability refrigerant, or a higher flammability refrigerant. The mildly flammable refrigerant is classified as "Class 2L" in U.S. ANSI/ASHRAE Standard 34-2013. The lower flammability refrigerant is classified as "Class 2" in U.S. ANSI/ASHRAE Standard 34-2013. The higher flammability refrigerant is classified as "Class 3" in U.S. ANSI/ASHRAE Standard 34-2013.

According to one or more embodiments, the first connection pipe group includes a gas-side first connection pipe group through which the gas refrigerant flows and a liquid-side first connection pipe group through which the liquid refrigerant flows. The first refrigerant shut-off unit includes a gas-side first refrigerant shut-off valve and a liquid-side first refrigerant shut-off valve. The gas-side first refrigerant shut-off valve is disposed on a second refrigerant circuit-side end of the gas-side first connection pipe group. The liquid-side first refrigerant shut-off valve is disposed on a second refrigerant circuit-side end of the liquid-side first connection pipe group.

According to one or more embodiments, the gas-side first refrigerant shut-off valve and the liquid-side first refrigerant shut-off valve separate the refrigerant in the first refrigerant circuit in the first utilization-side unit group and the first connection pipe group from the second refrigerant circuit of the heat source-side unit, without use of flow rate regulation valves or the like of the first refrigerant circuit in first utilization-side unit group.

According to one or more embodiments, the information on the capabilities of the N utilization-side units in the first utilization-side unit group contains at least one of a number N, a total capacity, and a combination pattern. The number N is the number of utilization-side units in the first utilization-side unit group. The total capacity is a total value of capacities of the utilization-side units in the first utilization-side unit group. The combination pattern is of the capacities of the utilization-side units in the first utilization-side unit group.

According to one or more embodiments, the first connection pipe group has a length fixed based on the information on the capabilities of the N utilization-side units in the first utilization-side unit group and a pipe diameter of the first connection pipe group.

One or more embodiments provide a refrigerant cycle system including a plurality of utilization-side units, a heat source-side unit, a connection pipe group, and a refrigerant shut-off unit. Each of the utilization-side units includes a first refrigerant circuit. The heat source-side unit includes a second refrigerant circuit. The connection pipe group connects the first refrigerant circuit and the second refrigerant circuit. The refrigerant shut-off unit is disposed between the first refrigerant circuit and the second refrigerant circuit, and is configured to block a refrigerant flowing through the connection pipe group. The refrigerant flowing through the first refrigerant circuit, the second refrigerant circuit, and the connection pipe group has flammability. The plurality of utilization-side units include a first utilization-side unit group. The first utilization-side unit group is a group of N (N: an integer equal to or more than two) utilization-side units. The refrigerant shut-off unit includes a first refrigerant shut-off unit. The first refrigerant shut-off unit is configured to block (shut off) a flow of the refrigerant between the first refrigerant circuit in the first utilization-side unit group and the second refrigerant circuit. The connection pipe group includes a first connection pipe group. The first connection pipe group connects the first refrigerant circuit in the first utilization-side unit group and the first refrigerant shut-off unit. The first connection pipe group has one of or both a length and an internal volume fixed (determined) based on information on capabilities of the N utilization-side units in the first utilization-side unit group.

With regard to arrangement of the first refrigerant shut-off unit, heretofore, it has been proposed to employ an idea of bringing the first refrigerant shut-off unit close to the first utilization-side unit group as much as possible. In contrast, the refrigerant cycle system according to one or more embodiments fixes, for example, the length and the like (one of or both the length and the internal volume) of the first connection pipe group relevant to the arrangement of the shut-off valve, based on the information on the capabilities of the N utilization-side units in the first utilization-side unit group.

If leakage of the refrigerant occurs at anywhere in the first utilization-side unit group due to damage, after the closing of the first refrigerant shut-off unit, a sum of the refrigerant in the first utilization-side unit and the refrigerant in the first connection pipe group is a maximum amount of the refrigerant leaking from the first utilization-side unit group. In view of this, the refrigerant cycle system according to one or more embodiments fixes, for example, the length (specifically, one of or both the length and the internal volume) of the first connection pipe group, based on the information on the capabilities of the N utilization-side units in the first utilization-side unit group. This configuration improves the degree of freedom as to the arrangement of the first refrigerant shut-off unit as compared with a conventional configuration.

BRIEF DESCRIPTION OF THE DRAWINGS

FIG. 4 is a table of a relationship between a total value of capacities of utilization-side units downstream of a shut-off valve and a restriction on a total value of lengths of pipes in a connection pipe group downstream of the shut-off valve.

FIG. 5 is a table of a relationship between a combination pattern of utilization-side units and a restriction on a total value of lengths of pipes in a connection pipe group, in Modification A.

DETAILED DESCRIPTION (1) Configuration of Air Conditioning Apparatus

Figure 1:
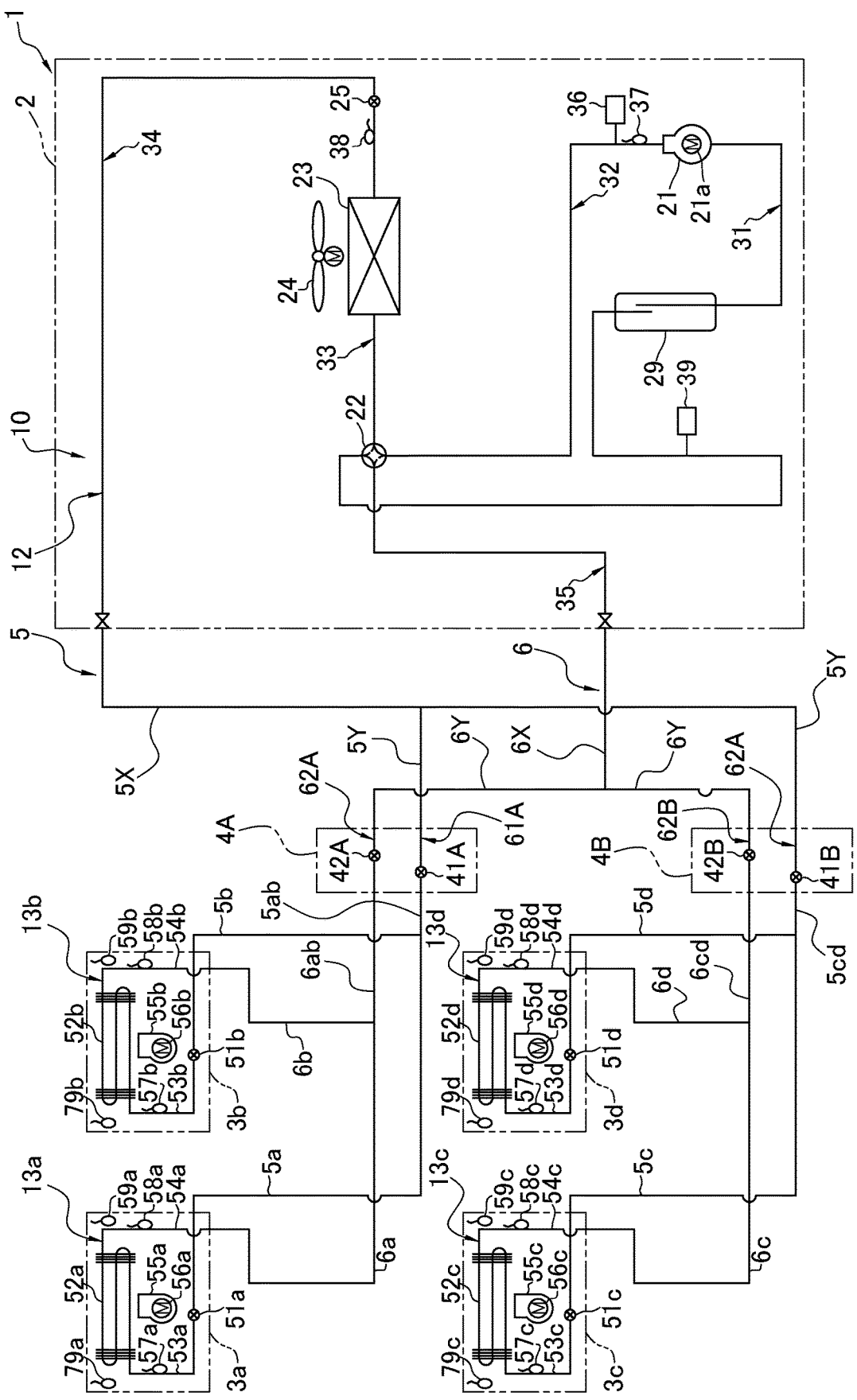
FIG. 1 is a schematic configuration diagram of an air conditioning apparatus according to one or more embodiments of the invention.

FIG. 1 illustrates a schematic configuration of an air conditioning apparatus 1 according to one or more embodiments of the invention. The air conditioning apparatus 1 is configured to cool and heat the interiors of rooms in a building or the like by a vapor compression refrigeration cycle. The air conditioning apparatus 1 mainly includes a heat source-side unit 2, a plurality of utilization-side units 3a, 3b, 3c, and 3d, a relay units 4A, 4B connected to the utilization-side units 3a, 3b, 3c and 3d, refrigerant connection pipes 5 and 6, and a control unit 19 (see FIG. 2A). The plurality of utilization-side units 3a, 3b, 3c, and 3d are connected to the heat source-side unit 2 in parallel. The refrigerant connection pipes 5 and 6 connect the heat source-side unit 2 to the utilization-side units 3a, 3b, 3c, and 3d via the relay units 4A and 4B. The control unit 19 controls constituent elements of the heat source-side unit 2, utilization-side units 3a, 3b, 3c, and 3d, and relay units 4A and 4B. The air conditioning apparatus 1 includes a vapor compression refrigerant circuit 10. The refrigerant circuit 10 is configured by connecting a heat source-side refrigerant circuit 12 of the heat source-side unit 2, utilization-side refrigerant circuits 13a, 13b, 13c, and 13d of the utilization-side units 3a, 3b, 3c, and 3d, the relay units 4A and 4B, and the refrigerant connection pipes 5 and 6.

The refrigerant circuit 10 is filled with R32 as a refrigerant. Leakage of R32 from the refrigerant circuit 10 into rooms (spaces where the utilization-side units are installed) in high concentrations may cause a combustion accident due to the flammability of the refrigerant. It has been required to prevent this combustion accident.

In the air conditioning apparatus 1, the heat source-side unit 2 includes a switching mechanism 22 configured to switch between a cooling operation and a heating operation of each of the utilization-side units 3a, 3b, 3c, and 3d.

(1-1) Refrigerant Connection Pipes

The liquid-side refrigerant connection pipe 5 mainly includes a main pipe portion 5X extending from the heat source-side unit 2, a plurality of branched pipe portions 5Y branching off from the main pipe portion 5X before the relay units 4A and 4B, and downstream pipe portions connecting the relay units 4A and 4B and the utilization-side units 3a, 3b, 3c, and 3d.

The gas-side refrigerant connection pipe 6 mainly includes a main pipe portion 6X extending from the heat source-side unit 2, a plurality of branched pipe portions 6Y branching off from the main pipe portion 6X before the relay units 4A and 4B, and downstream pipe portions connecting the relay units 4A and 4B and the utilization-side units 3a, 3b, 3c, and 3d.

As illustrated in FIG. 1, the downstream pipe portions of the liquid-side refrigerant connection pipe 5 and the downstream pipe portions of the gas-side refrigerant connection pipe 6 include a first connection pipe group 5ab, 5a, 5b, 6ab, 6a, 6b connecting the relay unit 4A and the utilization-side units 3a and 3b. The first connection pipe group 5ab, 5a, 5b, 6ab, 6a, 6b includes common pipes 5ab, 6ab extending from the relay unit 4A to the utilization-side units 3a and 3b, most-downstream pipes 5a, 6a branching off from the common pipes 5ab, 6ab and extending to the utilization-side refrigerant circuit 13a of the utilization-side unit 3a, and most-downstream pipes 5b, 6b branching off from the common pipe 5ab, 6ab and extending to the utilization-side refrigerant circuit 13b of the utilization-side unit 3b.

The liquid refrigerant flowing through the liquid-side refrigerant connection pipe 5 is in a liquid phase or has a larger ratio of a liquid phase than that of a gas phase. The gas refrigerant flowing through the gas-side refrigerant connection pipe 6 is in a gas phase or has a larger ratio of a gas phase than that of a liquid phase.

(1-2) Utilization-Side Units

The utilization-side units 3a, 3b, 3c, and 3d are installed in rooms of a building or the like. As described above, the utilization-side refrigerant circuits 13a, 13b, 13c, and 13d of the utilization-side units 3a, 3b, 3c, and 3d are connected to the heat source-side unit 2 via the liquid-side refrigerant connection pipe 5, the gas-side refrigerant connection pipe 6, and the relay units 4A and 4B, and each serves as a part of the refrigerant circuit 10.

Next, a description will be given of a configuration of each of the utilization-side units 3a, 3b, 3c, and 3d. Since the utilization-side unit 3a is similar in configuration to the utilization-side units 3b, 3c, and 3d, a description will be given of only the configuration of the utilization-side unit 3a. The components of the utilization-side units 3b, 3c, and 3d are not described since the components can be understood in such a way that the alphabet "a" in the reference signs representing the respective components of the utilization-side unit 3a is replaced with the alphabets "b", "c", and "d".

The utilization-side unit 3a mainly includes a utilization-side expansion valve 51a and a utilization-side heat exchanger 52a. The utilization-side unit 3a also includes a utilization-side liquid refrigerant pipe 53a connecting a liquid-side end of the utilization-side heat exchanger 52a and the liquid-side refrigerant connection pipe 5 (here, the most-downstream pipe 5a), and a utilization-side gas refrigerant pipe 54a connecting a gas-side end of the utilization-side heat exchanger 52a and the gas-side refrigerant connection pipe 6 (here, the most-downstream pipe 6a).

The utilization-side expansion valve 51a is an electric expansion valve which is capable of adjusting a flow rate of the refrigerant flowing through the utilization-side heat exchanger 52a while decompressing the refrigerant. The utilization-side expansion valve 51a is disposed on the utilization-side liquid refrigerant pipe 53a.

The utilization-side heat exchanger 52a functions as a refrigerant evaporator to cool indoor air, or functions as a refrigerant radiator to heat the indoor air. The utilization-side unit 3a includes a utilization-side fan 55a. The utilization-side fan 55a provides, to the utilization-side heat exchanger 52a, the indoor air serving as a cooling source or a heating source for the refrigerant flowing through the utilization-side heat exchanger 52a. The utilization-side fan 55a is driven by a utilization-side fan motor 56a.

The utilization-side unit 3a includes various sensors. Specifically, the utilization-side unit 3a includes a utilization-side heat exchange liquid-side sensor 57a that detects a temperature of the refrigerant at the liquid-side end of the utilization-side heat exchanger 52a, a utilization-side heat exchange gas-side sensor 58a that detects a temperature of the refrigerant at the gas-side end of the utilization-side heat exchanger 52a, and an indoor air sensor 59a that detects a temperature of the indoor air sucked into the utilization-side unit 3a. The utilization-side unit 3a also includes a refrigerant leakage detection unit 79a that detects leakage of the refrigerant. Examples of the refrigerant leakage detection unit 79a may include, but not limited to, a semiconductor gas sensor and a detection unit configured to detect a rapid refrigerant pressure drop in the utilization-side unit 3a. In a case where the refrigerant leakage detection unit 79a is a semiconductor gas sensor, the refrigerant leakage detection unit 79a is connected to a utilization-side control unit 93a (see FIG. 2A). In a case where the refrigerant leakage detection unit 79a is a detection unit configured to detect a rapid refrigerant pressure drop, a pressure sensor is disposed on a refrigerant pipe, and the utilization-side control unit 93a is equipped with a detection algorithm for determining leakage of the refrigerant from a change of the sensor value.

According to one or more embodiments, the utilization-side unit 3a includes the refrigerant leakage detection unit 79a. The refrigerant leakage detection unit 79a may alternatively be incorporated in a remote controller for operating the utilization-side unit 3a or installed in, for example, an indoor space to be subjected to air conditioning by the utilization-side unit 3a.

(1-3) Heat Source-Side Unit

The heat source-side unit 2 is installed outdoors, for example, on the rooftop of a building or on the ground. As described above, the heat source-side refrigerant circuit 12 of the heat source-side unit 2 is connected to the utilization-side units 3a, 3b, 3c, and 3d via the liquid-side refrigerant connection pipe 5, the gas-side refrigerant connection pipe 6, and the relay units 4A and 4B, and serves as a part of the refrigerant circuit 10.

The heat source-side unit 2 mainly includes a compressor 21 and a heat source-side heat exchanger 23. The heat source-side unit 2 also includes the switching mechanism 22 as a mechanism configured to switch between the cooling operation and the heating operation. The switching mechanism 22 switches between a cooling operation state in which the heat source-side heat exchanger 23 functions as a refrigerant radiator and each of the utilization-side heat exchangers 52a, 52b, 52c, and 52d functions as a refrigerant evaporator and a heating operation state in which the heat source-side heat exchanger 23 functions as a refrigerant evaporator and each of the utilization-side heat exchangers 52a, 52b, 52c, and 52d functions as a refrigerant radiator. A suction refrigerant pipe 31 connects the switching mechanism 22 and a suction side of the compressor 21. An accumulator 29 is disposed on the suction refrigerant pipe 31. The accumulator 29 temporarily stores the refrigerant to be sucked into the compressor 21. A discharge refrigerant pipe 32 connects a discharge side of the compressor 21 and the switching mechanism 22. A first heat source-side gas refrigerant pipe 33 connects the switching mechanism 22 and a gas-side end of the heat source-side heat exchanger 23. A heat source-side liquid refrigerant pipe 34 connects a liquid-side end of the heat source-side heat exchanger 23 and the liquid-side refrigerant connection pipe 5. A second heat source-side gas refrigerant pipe 35 connects the switching mechanism 22 and the gas-side refrigerant connection pipe 6.

The compressor 21 is configured to compress the refrigerant. The compressor 21 to be used herein is, for example, a closed compressor in which a displacement, such as rotary or scroll, compression element (not illustrated) is driven to rotate by a compressor motor 21a.

The switching mechanism 22 is, for example, a four-way switching valve capable of switching a flow of the refrigerant in the refrigerant circuit 10. In the case where the heat source-side heat exchanger 23 functions as a refrigerant radiator and each of the utilization-side heat exchangers 52a, 52b, 52c, and 52d functions as a refrigerant evaporator (hereinafter, this case will be referred to as the "cooling operation state"), the switching mechanism 22 connects the discharge side of the compressor 21 to the gas side of the heat source-side heat exchanger 23 (see a solid line on the switching mechanism 22 illustrated in FIG. 1). In the case where the heat source-side heat exchanger 23 functions as a refrigerant evaporator and each of the utilization-side heat exchangers 52a, 52b, 52c, and 52d functions as a refrigerant radiator (hereinafter, this case will be referred to as the "heating operation state"), the switching mechanism 22 connects the suction side of the compressor 21 to the gas side of the heat source-side heat exchanger 23 (see a broken line on the first switching mechanism 22 illustrated in FIG. 1).

The heat source-side heat exchanger 23 functions as a refrigerant radiator or a refrigerant evaporator. The heat source-side unit 2 includes a heat source-side fan 24. The heat source-side fan 24 provides outdoor air to the heat source-side unit 2. The heat source-side unit 2 sucks therein the outdoor air, and the heat source-side heat exchanger 23 causes the outdoor air to exchange heat with the refrigerant. The outdoor air is then discharged from the heat source-side unit 2. The heat source-side fan 24 is driven by a heat source-side fan motor.

In the cooling operation of the air conditioning apparatus 1, the refrigerant flows from the heat source-side heat exchanger 23 to the utilization-side heat exchangers 52a, 52b, 52c, and 52d each functioning as a refrigerant evaporator, through the liquid-side refrigerant connection pipe 5 and the relay units 4A and 4B. In the heating operation of the air conditioning apparatus 1, the refrigerant flows from the compressor 21 to the utilization-side heat exchangers 52a, 52b, 52c, and 52d each functioning as a refrigerant radiator, through the gas-side refrigerant connection pipe 6 and the relay units 4A and 4B. In the cooling operation, the switching mechanism 22 switches to the cooling operation state. The heat source-side heat exchanger 23 functions as a refrigerant radiator. The refrigerant flows from the heat source-side unit 2 to the utilization-side units 3a, 3b, 3c, and 3d through the liquid-side refrigerant connection pipe 5 and the relay units 4A and 4B. In the heating operation, the switching mechanism 22 switches to the heating operation state. The refrigerant flows from the utilization-side units 3a, 3b, 3c, and 3d to the heat source-side unit 2 through the liquid-side refrigerant connection pipe 5 and the relay units 4A and 4B. The heat source-side heat exchanger 23 functions as a refrigerant evaporator.

A heat source-side expansion valve 25 is disposed on the heat source-side liquid refrigerant pipe 34. The heat source-side expansion valve 25 is electrically driven to decompress the refrigerant in the heating operation. The heat source-side expansion valve 25 is disposed near the liquid-side end of the heat source-side heat exchanger 23 on the heat source-side liquid refrigerant pipe 34.

The heat source-side unit 2 includes various sensors. Specifically, the heat source-side unit 2 includes a discharge pressure sensor 36 that detects a pressure (a discharge pressure) of the refrigerant discharged from the compressor 21, a discharge temperature sensor 37 that detects a temperature (a discharge temperature) of the refrigerant discharged from the compressor 21, and a suction pressure sensor 39 that detects a pressure (a suction pressure) of the refrigerant sucked into the compressor 21. The heat source-side unit 2 also includes a heat source-side heat exchange liquid-side sensor 38 that detects a temperature (a heat source-side heat exchange outlet temperature) of the refrigerant at the liquid-side end of the heat source-side heat exchanger 23.

(1-4) Relay Units

The relay units 4A and 4B are installed indoors, for example, in attic spaces of rooms and passageways in a building. The relay units 4A and 4B are interposed together with the liquid-side refrigerant connection pipe 5 and the gas-side refrigerant connection pipe 6 between the utilization-side units 3a, 3b, 3c, and 3d and the heat source-side unit 2, and each serves as a part of the refrigerant circuit 10. The relay units 4A and 4B function as refrigerant shut-off units that block the flows of the refrigerant between the utilization-side units 3a, 3b, 3c, and 3d and the heat source-side unit 2. The relay units 4A, 4B may be disposed near the utilization-side units 3a, 3b, 3c, 3d. Alternatively, the relay units 4A, 4B may be disposed away from the utilization-side units 3a, 3b, 3c, 3d. Still alternatively, the relay units 4A and 4B may be collectively disposed at one place.

Next, a description will be given of a configuration of each of the relay units 4A and 4B. Since the relay unit 4A is similar in configuration to the relay unit 4B, a description will be given of only the configuration of the relay unit 4A. The components of the relay unit 4B are not described since the components can be understood in such a way that the alphabet "A" in the reference signs representing the respective components of the relay unit 4A is replaced with the alphabet "B".

The relay unit 4A mainly includes a liquid connection pipe 61A and a gas connection pipe 62A.

The liquid connection pipe 61A has a first end connected to one of the branched pipe portions 5Y of the liquid-side refrigerant connection pipe 5 and a second end connected to the common pipe 5ab of the liquid-side refrigerant connection pipe 5. A liquid relay shut-off valve 41A is disposed on the liquid connection pipe 61A. The liquid relay shut-off valve 41A is an electric expansion valve.

The gas connection pipe 62A has a first end connected to one of the branched pipe portions 6Y of the gas-side refrigerant connection pipe 6 and a second end connected to the common pipe 6ab of the gas-side refrigerant connection pipe 6. A gas relay shut-off valve 42A is disposed on the gas connection pipe 62A. The gas relay shut-off valve 42A is an electric expansion valve.

In the cooling operation and the heating operation, each of the liquid relay shut-off valve 41A and the gas relay shut-off valve 42A is in a fully open state.

(1-5) Control Unit

Figure 2A:
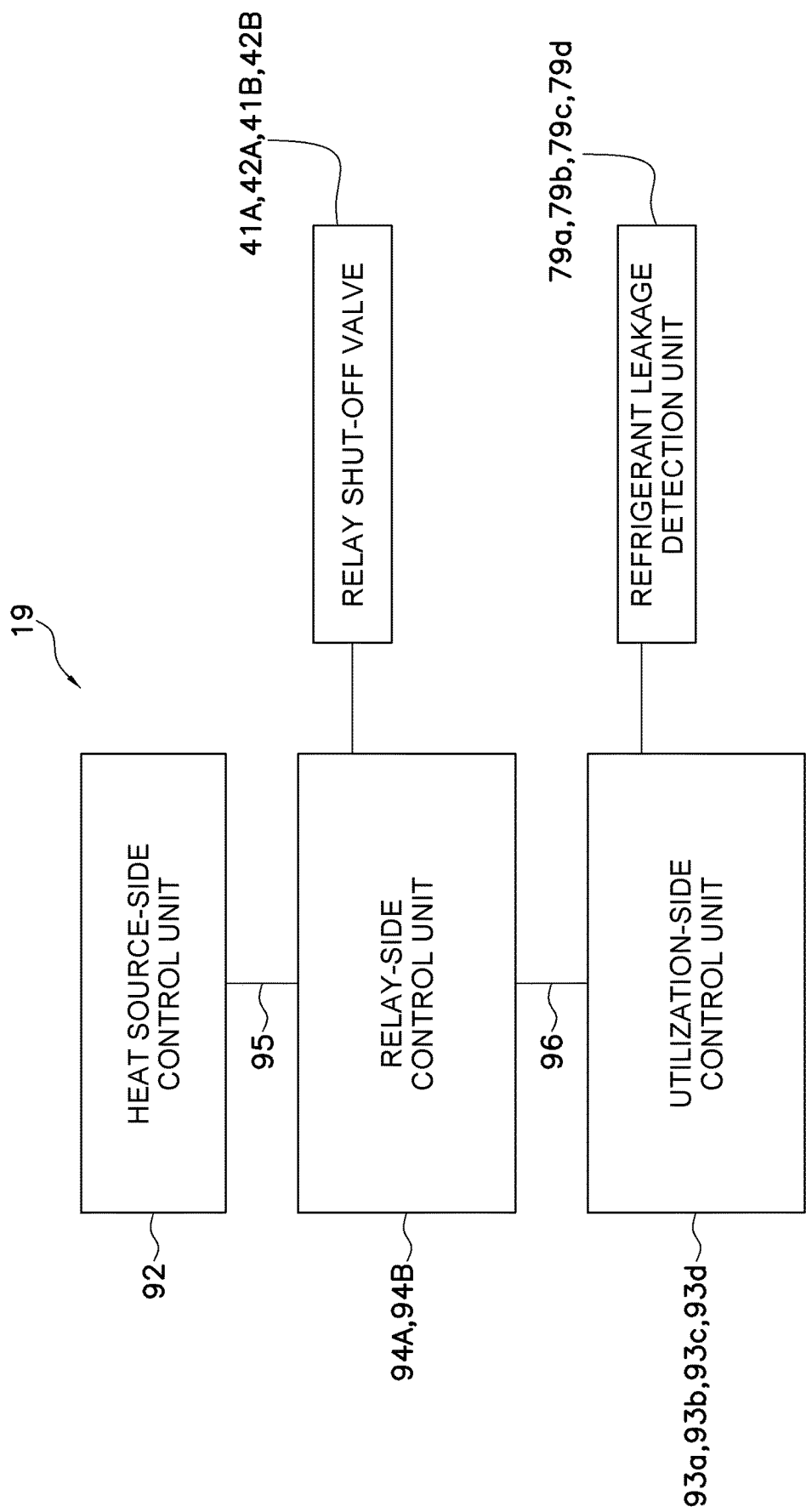
FIG. 2A is a control block diagram of the air conditioning apparatus.

As illustrated in FIG. 2A, the control unit 19 includes a heat source-side control unit 92, relay-side control units 94A and 94B connected to the heat source-side control unit 92 via a transmission line 95, and utilization-side control units 93a, 93b, 93c, and 93d connected to the relay-side control units 94A and 94B via a transmission line 96. The heat source-side control unit 92 controls the constituent components of the heat source-side unit 2. The relay-side control unit 94A controls the constituent components of the relay unit 4A, and the relay-side control unit 94B controls the constituent components of the relay unit 4B. The utilization-side control unit 93a controls the constituent components of the utilization-side unit 3a, the utilization-side control unit 93b controls the constituent components of the utilization-side unit 3b, the utilization-side control unit 93c controls the constituent components of the utilization-side unit 3c, and the utilization-side control unit 93d controls the constituent components of the utilization-side unit 3d. The heat source-side control unit 92 of the heat source-side unit 2, the relay-side control units 94A and 94B of the relay units 4A and 4B, and the utilization-side control units 93a, 93b, 93c, and 93d of the utilization-side units 3a, 3b, 3c, and 3d exchange information such as control signals with one another via the transmission lines 95 and 96.

The heat source-side control unit 92 includes a control board having electric components such as a microcomputer and a memory mounted thereon. The heat source-side control unit 92 is connected to the various constituent components 21, 22, 24, and 25 and various sensors 36, 37, 38, and 39 of the heat source-side unit 2. Each of the relay-side control units 94A and 94B includes a control board having electric components such as a microcomputer and a memory mounted thereon. The relay-side control unit 94A is connected to the gas relay shut-off valve 42A and liquid relay shut-off valve 41A of the relay unit 4A. The relay-side control unit 94B is connected to the gas relay shut-off valve 42B and liquid relay shut-off valve 41B of the relay unit 4B. The relay-side control units 94A and 94B are connected to the heat source-side control unit 92 via the first transmission line 95. Each of the utilization-side control units 93a, 93b, 93c, and 93d includes a control board having electric components such as a microcomputer and a memory mounted thereon. The utilization-side control unit 93a is connected to the various constituent components 51a and 55a and various sensors 57a, 58a, 59a, and 79a of the utilization-side unit 3a. The utilization-side control unit 93b is connected to the various constituent components 51b and 55b and various sensors 57b, 58b, 59b, and 79b of the utilization-side unit 3b. The utilization-side control unit 93c is connected to the various constituent components 51c and 55c and various sensors 57c, 58c, 59c, and 79c of the utilization-side unit 3c. The utilization-side control unit 93d is connected to the various constituent components 51d and 55d and various sensors 57d, 58d, 59d, and 79d of the utilization-side unit 3d.

The utilization-side control units 93a, 93b, 93c, and 93d are connected to the relay-side control units 94A and 94B via the second transmission line 96.

In this way, the control unit 19 controls the operation of the entire air conditioning apparatus 1. Specifically, the control unit 19 controls the various constituent components 21, 22, 24, 25, 51a to 51d, 55a to 55d, 41A, 41B, 42A, and 42B of the air conditioning apparatus 1 (here, the heat source-side unit 2, utilization-side units 3a, 3b, 3c, and 3d, and relay units 4A and 4B), based on, for example, detection signals from the various sensors 36, 37, 38, 39, 57a to 57d, 58a to 58d, 59a to 59d, and 79a to 79d.

(2) Basic Operation of Air Conditioning Apparatus

Next, a description will be given of a basic operation of the air conditioning apparatus 1. The basic operation of the air conditioning apparatus 1 includes the cooling operation and the heating operation as described above. The basic operation of the air conditioning apparatus 1 to be described below is performed by the control unit 19 that controls the constituent components of the air conditioning apparatus 1 (the heat source-side unit 2, utilization-side units 3a, 3b, 3c, and 3d, and relay units 4A and 4B).

(2-1) Cooling Operation

In the cooling operation, for example, in a case where all the utilization-side units 3a, 3b, 3c, and 3d perform the cooling operation (in which all the utilization-side heat exchangers 52a, 52b, 52c, and 52d function as a refrigerant evaporator, and the heat source-side heat exchanger 23 functions as a refrigerant radiator), the switching mechanism 22 switches to the cooling operation state (the state indicated by the solid line on the switching mechanism 22 illustrated in FIG. 1), so that the compressor 21, the heat source-side fan 24, and the utilization-side fans 55a, 55b, 55c, and 55d are driven. In addition, the liquid relay shut-off valve 41A and gas relay shut-off valve 42A of the relay unit 4A are fully opened, and the liquid relay shut-off valve 41B and gas relay shut-off valve 42B of the relay unit 4B are fully opened.

In the cooling operation, the high-pressure refrigerant discharged from the compressor 21 flows into the heat source-side heat exchanger 23 through the switching mechanism 22. When the refrigerant flows into the heat source-side heat exchanger 23, the heat source-side heat exchanger 23 functioning as a refrigerant radiator cools the refrigerant by heat exchange with the outdoor air provided by the heat source-side fan 24 to condense the refrigerant. The refrigerant flows out of the heat source-side unit 2 through the heat source-side expansion valve 25.

When the refrigerant flows out of the heat source-side unit 2, the refrigerant then flows into the relay units 4A and 4B in a branched manner through the liquid-side refrigerant connection pipe 5 (the main pipe portion 5X and branched pipe portions 5Y). When the refrigerant flows into the relay units 4A and 4B, the refrigerant then flows out of the relay units 4A and 4B through the liquid relay shut-off valves 41A and 41B.

When the refrigerant flows out of the relay units 4A and 4B, the refrigerant then flows into the utilization-side units 3a, 3b, 3c, and 3d through the common pipes 5ab and 5cd and the most-downstream pipes 5a, 5b, 5c, and 5d. When the refrigerant flows into the utilization-side units 3a, 3b, 3c, and 3d, each of the utilization-side expansion valves 51a, 51b, 51c, and 51d decompresses the refrigerant. The refrigerant then flows into the utilization-side heat exchangers 52a, 52b, 52c, and 52d. When the refrigerant flows into the utilization-side heat exchangers 52a, 52b, 52c, and 52d, the utilization-side heat exchangers 52a, 52b, 52c, and 52d each functioning as a refrigerant evaporator heat the refrigerant by heat exchange with indoor air supplied from the rooms by the utilization-side fans 55a, 55b, 55c, and 55d to evaporate the refrigerant. The refrigerant thus evaporated flows out of the utilization-side units 3a, 3b, 3c, and 3d. On the other hand, the indoor air cooled in the utilization-side heat exchangers 52a, 52b, 52c, and 52d is supplied to the rooms to cool the interiors of the rooms.

When the refrigerant flows out of the utilization-side units 3a, 3b, 3c, and 3d, the refrigerant then flows into the relay units 4A and 4B through the most-downstream pipes 6a, 6b, 6c, and 6d and common pipes 6ab and 6cd of the gas-side refrigerant connection pipe 6. When the refrigerant flows into the relay units 4A and 4B, the refrigerant then flows out of the relay units 4A and 4B through the gas relay shut-off valves 42A and 42B.

When the refrigerant flows out of the relay units 4A and 4B, the refrigerant then flows into the heat source-side unit 2 in a merged state through the gas-side refrigerant connection pipe 6 (the main pipe portion 6X and branched pipe portions 6Y). When the refrigerant flows into the heat source-side unit 2, the refrigerant is then sucked into the compressor 21 via the switching mechanism 22 and the accumulator 29.

(2-2) Heating Operation

In the heating operation, for example, in a case where all the utilization-side units 3a, 3b, 3c, and 3d perform the heating operation, the switching mechanism 22 switches to the heating operation state (the state indicated by the broken line on the switching mechanism 22 illustrated in FIG. 1), so that the compressor 21, the heat source-side fan 24, and the utilization-side fans 55a, 55b, 55c, and 55d are driven. In addition, the liquid relay shut-off valve 41A and gas relay shut-off valve 42A of the relay unit 4A are fully opened, and the liquid relay shut-off valve 41B and gas relay shut-off valve 42B of the relay unit 4B are fully opened.

The high-pressure refrigerant discharged from the compressor 21 flows out of the heat source-side unit 2 through the switching mechanism 22.

When the refrigerant flows out of the heat source-side unit 2, the refrigerant then flows into the relay units 4A and 4B through the gas-side refrigerant connection pipe 6 (the main pipe portion 6X and branched pipe portions 6Y). When the refrigerant flows into the relay units 4A and 4B, the refrigerant then flows out of the relay units 4A and 4B through the gas relay shut-off valves 42A and 42B.

When the refrigerant flows out of the relay units 4A and 4B, the refrigerant then flows into the utilization-side units 3a, 3b, 3c, and 3d through the common pipes 6ab and 6cd and the most-downstream pipes 6a, 6b, 6c, and 6d. When the refrigerant flows into the utilization-side units 3a, 3b, 3c, and 3d, the refrigerant then flows into the utilization-side heat exchangers 52a, 52b, 52c, and 52d. When the high-pressure refrigerant flows into the utilization-side heat exchangers 52a, 52b, 52c, and 52d, the utilization-side heat exchangers 52a, 52b, 52c, and 52d each functioning as a refrigerant radiator cool the refrigerant by heat exchange with indoor air supplied from the rooms by the utilization-side fans 55a, 55b, 55c, and 55d, to condense the refrigerant. Each of the utilization-side expansion valves 51a, 51b, 51c, and 51d decompresses the refrigerant thus condensed. The refrigerant then flows out of the utilization-side units 3a, 3b, 3c, and 3d. On the other hand, the indoor air heated in the utilization-side heat exchangers 52a, 52b, 52c, and 52d is supplied to the rooms to heat the interiors of the rooms.

When the refrigerant flows out of the utilization-side units 3a, 3b, 3c, and 3d, the refrigerant then flows into the relay units 4A and 4B through the most-downstream pipes 5a, 5b, 5c, and 5d and the common pipes 5ab and 5cd. When the refrigerant flows into the relay units 4A and 4B, the refrigerant then flows out of the relay units 4A and 4B through the liquid relay shut-off valves 41A and 41B.

When the refrigerant flows out of the relay units 4A and 4B, the refrigerant then flows into the heat source-side unit 2 in a merged state through the liquid-side refrigerant connection pipe 5 (the main pipe portion 5X and branched pipe portions 5Y). When the refrigerant flows into the heat source-side unit 2, the refrigerant then flows into the heat source-side expansion valve 25. When the refrigerant flows into the heat source-side expansion valve 25, the heat source-side expansion valve 25 decompresses the refrigerant. The refrigerant thus decompressed then flows into the heat source-side heat exchanger 23. When the refrigerant flows into the heat source-side heat exchanger 23, the heat source-side heat exchanger 23 heats the refrigerant by heat exchange with outdoor air provided by the heat source-side fan 24 to evaporate the refrigerant. The refrigerant thus evaporated is sucked into the compressor 21 via the switching mechanism 22 and the accumulator 29.

(3) Operation of Air Conditioning Apparatus Upon Leakage of Refrigerant

Figure 2B:
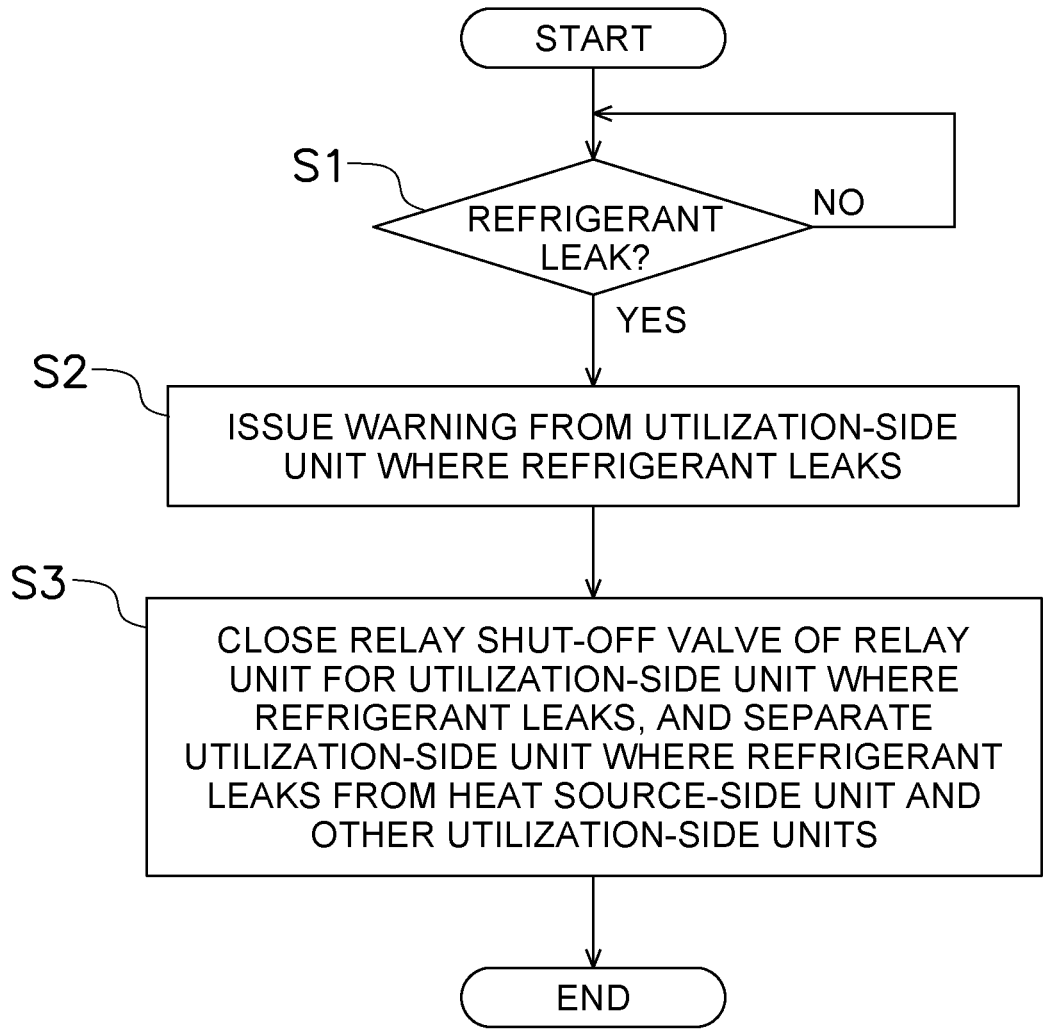
FIG. 2B is a flowchart of control upon leakage of a refrigerant.

With reference to FIG. 2B, next, a description will be given of an operation of the air conditioning apparatus 1 upon leakage of the refrigerant. As will be described below, the control unit 19 that controls the constituent components of the air conditioning apparatus 1 performs the operation of the air conditioning apparatus 1 upon leakage of the refrigerant, in a manner similar to that for the foregoing basic operation.

Since the control unit 19 performs the similar control even when the leakage of the refrigerant occurs at any of the utilization-side units 3a, 3b, 3c, and 3d, a description will be given of a case where, for example, the leakage of the refrigerant occurs at the room where the utilization-side unit 3a is installed.

As illustrated in FIG. 2B, in step S1, the control unit 19 determines whether any one of the refrigerant leakage detection units 79a, 79b, 79c, and 79d of the utilization-side units 3a, 3b, 3c, and 3d detects leakage of the refrigerant. When the refrigerant leakage detection unit 79a of the utilization-side unit 3a detects the leakage of the refrigerant into the space (i.e., the interior of the room) where the utilization-side unit 3a is installed, the processing proceeds to step S2.

In step S2, next, the utilization-side unit 3a causing the leakage of the refrigerant issues a warning to a person in the space where the utilization-side unit 3a is installed, using an alarm (not illustrated) configured to sound a buzzer and to turn a light on.

In step S3, next, the control unit 19 closes the liquid relay shut-off valve 41A and gas relay shut-off valve 42A of the relay unit 4A for the utilization-side unit 3a causing the leakage of the refrigerant. The control unit 19 thus separates the upstream side and downstream side (where the utilization-side units 3a and 3b are provided) of the relay unit 4A from each other to stop the flow of the refrigerant via the relay unit 4A. The refrigerant thus never flows from the heat source-side unit 2 or the other utilization-side units 3c and 3d to the utilization-side units 3a and 3b.

(4) Arrangement of Relay Unit Functioning as Refrigerant Shut-Off Unit (4-1) Importance of Arrangement of Relay Unit As described above, if the refrigerant leaks from, for example, the utilization-side refrigerant circuit 13a of the utilization-side unit 3a, the control unit 19 closes the liquid relay shut-off valve 41A and gas relay shut-off valve 42A of the relevant relay unit 4A. The amount of the refrigerant that leaks into the space where the utilization-side unit 3a is installed therefore takes a maximum value equal to a total value of the amounts of the refrigerant in the utilization-side refrigerant circuit 13a of the utilization-side unit 3a, the utilization-side refrigerant circuit 13b of the utilization-side unit 3b, the common pipes 5ab and 6ab, and the most-downstream pipes 5a, 6a, 5b, and 6b on the downstream side of the relay unit 4A. As described in the foregoing item (1-1), a part of the liquid-side refrigerant connection pipe 5 and a part of the gas-side refrigerant connection pipe 6 located closer to the utilization-side units 3a and 3b than to the relay unit 4A are called the first connection pipe group (5ab, 5a, 5b, 6ab, 6a, 6b).

In other words, a sum of the amount of the refrigerant in the first connection pipe group (5ab, 5a, 5b, 6ab, 6a, 6b) and the amount of the refrigerant in the utilization-side refrigerant circuits 13a and 13b of the utilization-side units 3a and 3b corresponds to a maximum value of the amount of the refrigerant that leaks into the space where the utilization-side unit 3a causing the leakage of the refrigerant is installed. The maximum refrigerant leak amount is referred to as a refrigerant amount Q.

Figure 3A:
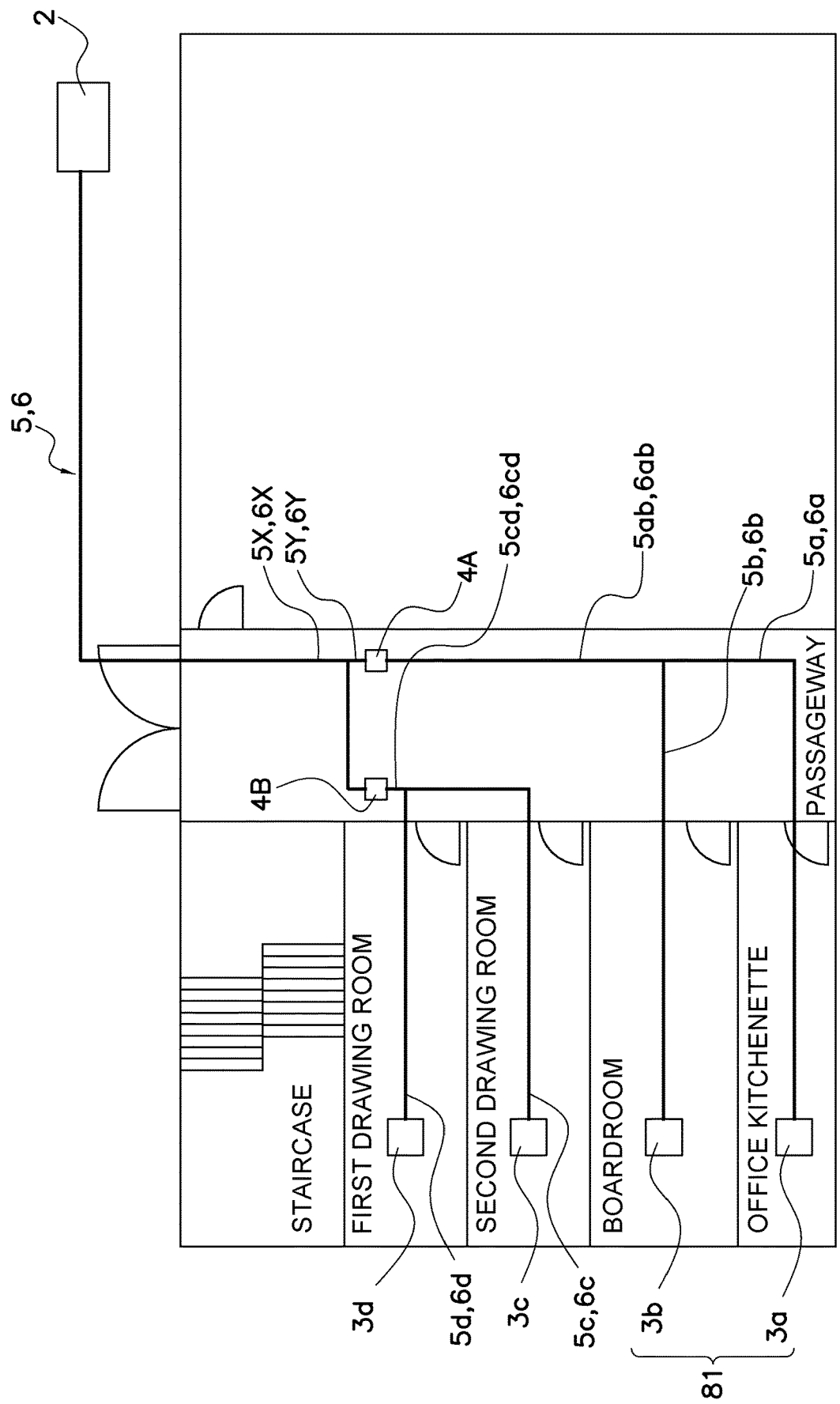
FIG. 3A is a diagram of exemplary arrangement A of a heat source-side unit, utilization-side units, and relay units.

As illustrated in FIG. 3A, it is assumed herein that the utilization-side unit 3a is installed on the ceiling of a small office kitchenette, the utilization-side unit 3b is installed on the ceiling of a large boardroom, the utilization-side unit 3c is installed on the ceiling of a first drawing room of a medium size, and the utilization-side unit 3d is installed on the ceiling of a second drawing room of a medium size. The heat source-side unit 2 is installed at a place slightly away from the four rooms. It is also assumed herein that there is an on-the-job demand to install the relay units 4A and 4B on the attic of a passageway adjacent to the four rooms and arrange the relay units 4A and 4B side by side as illustrated in FIG. 3A in consideration of maintainability.

However, in a case where the utilization-side units 3a and 3b each have a large capacity and a total pipe length of the first connection pipe group (5ab, 5a, 5b, 6ab, 6a, 6b) takes a large value, if the refrigerant leaks into the small office kitchenette, where the utilization-side unit 3a is installed, by the refrigerant amount Q, the concentration of the refrigerant R32 in the vicinity of a floor surface of the office kitchenette may increase to exceed a lower flammability limit (LFL)/safety factor (e.g., a safety factor of 4), depending on a floor area of the office kitchenette. The LFL refers to a minimum concentration of a refrigerant that enables propagation of flames with the refrigerant and air mixed evenly, in conformance with ISO817.

Figure 3B:
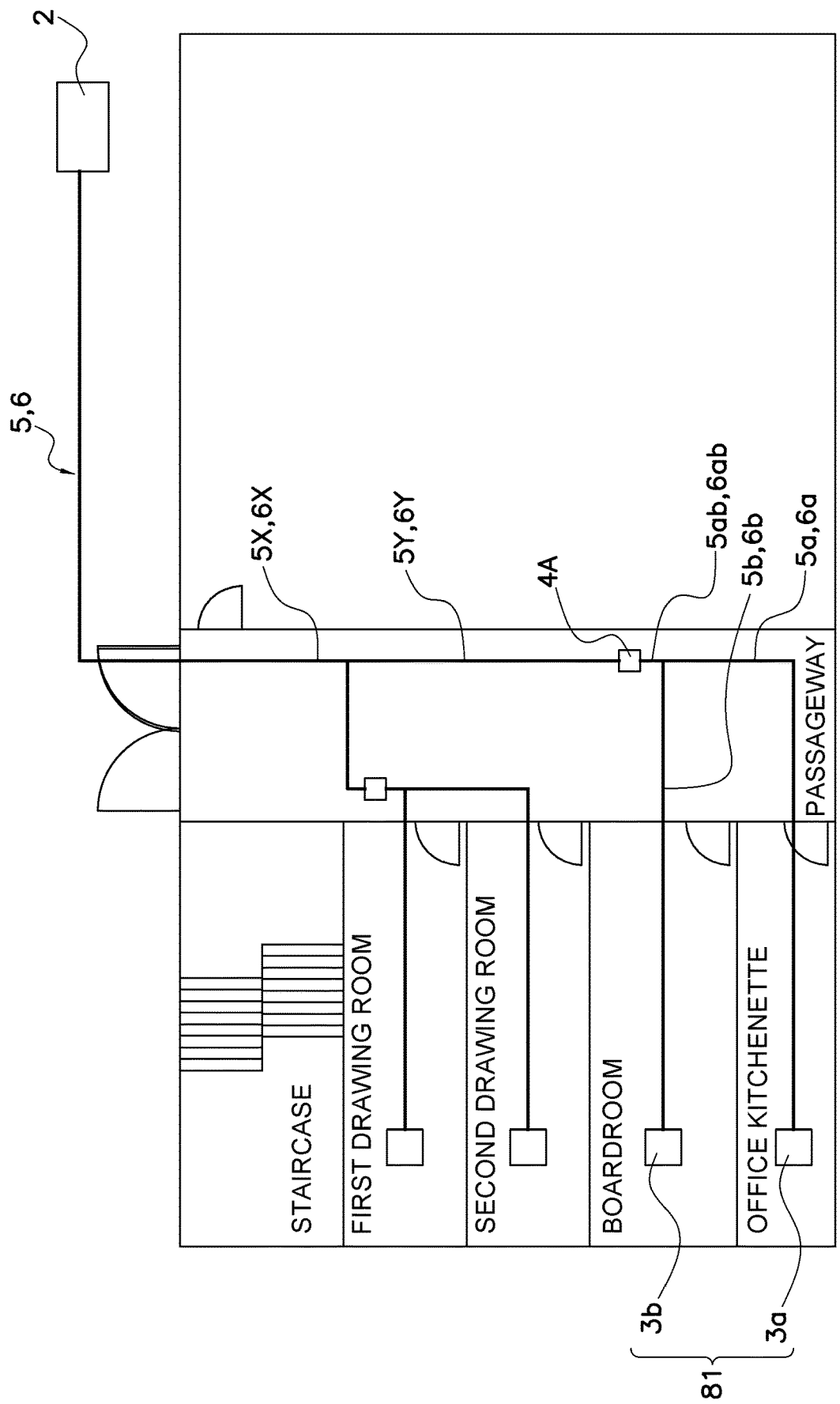
FIG. 3B is a diagram of exemplary arrangement B of the heat source-side unit, the utilization-side units, and the relay units.
Figure 3C:
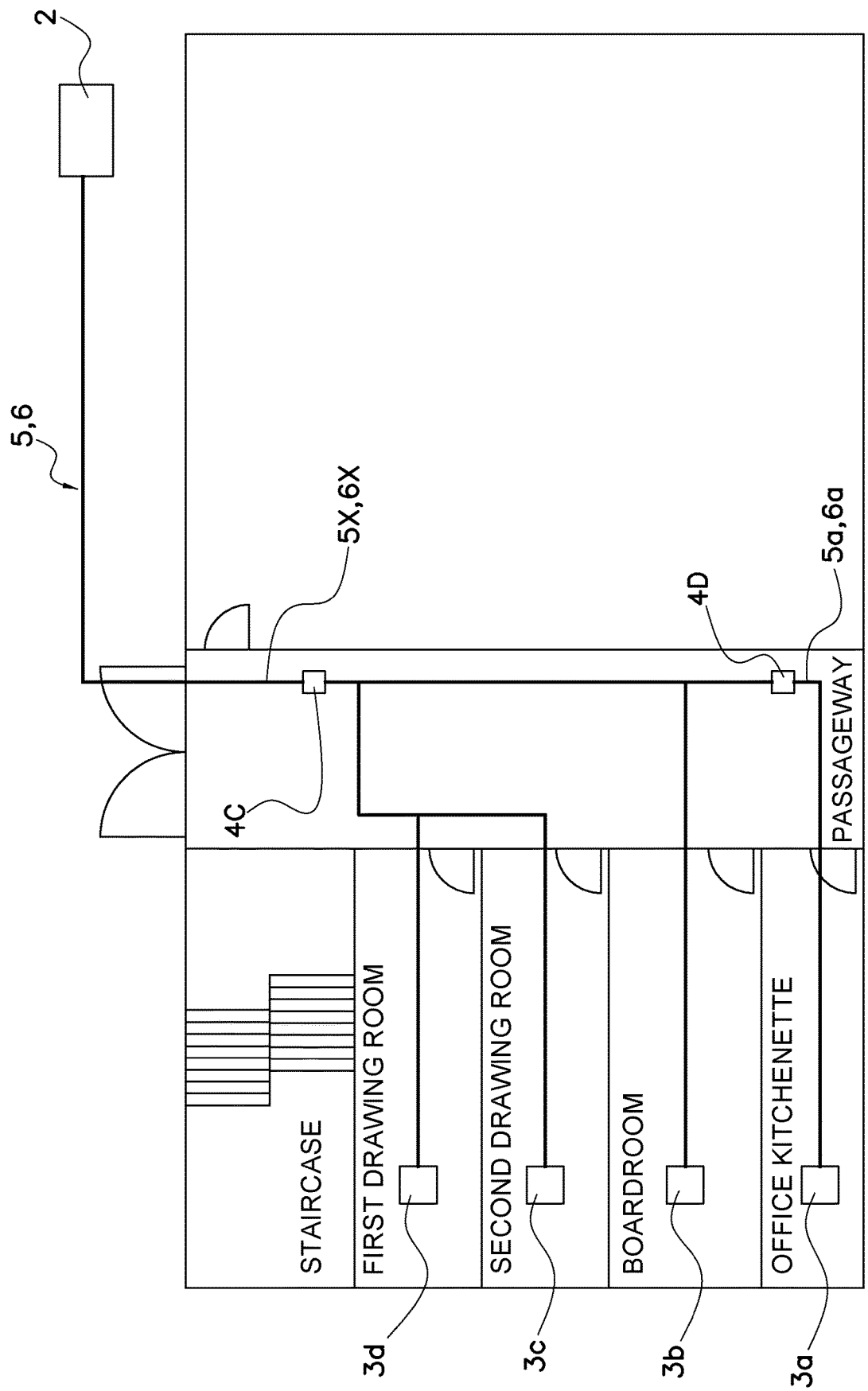
FIG. 3C is a diagram of exemplary arrangement C of the heat source-side unit, the utilization-side units, and relay units.
Figure 3D:
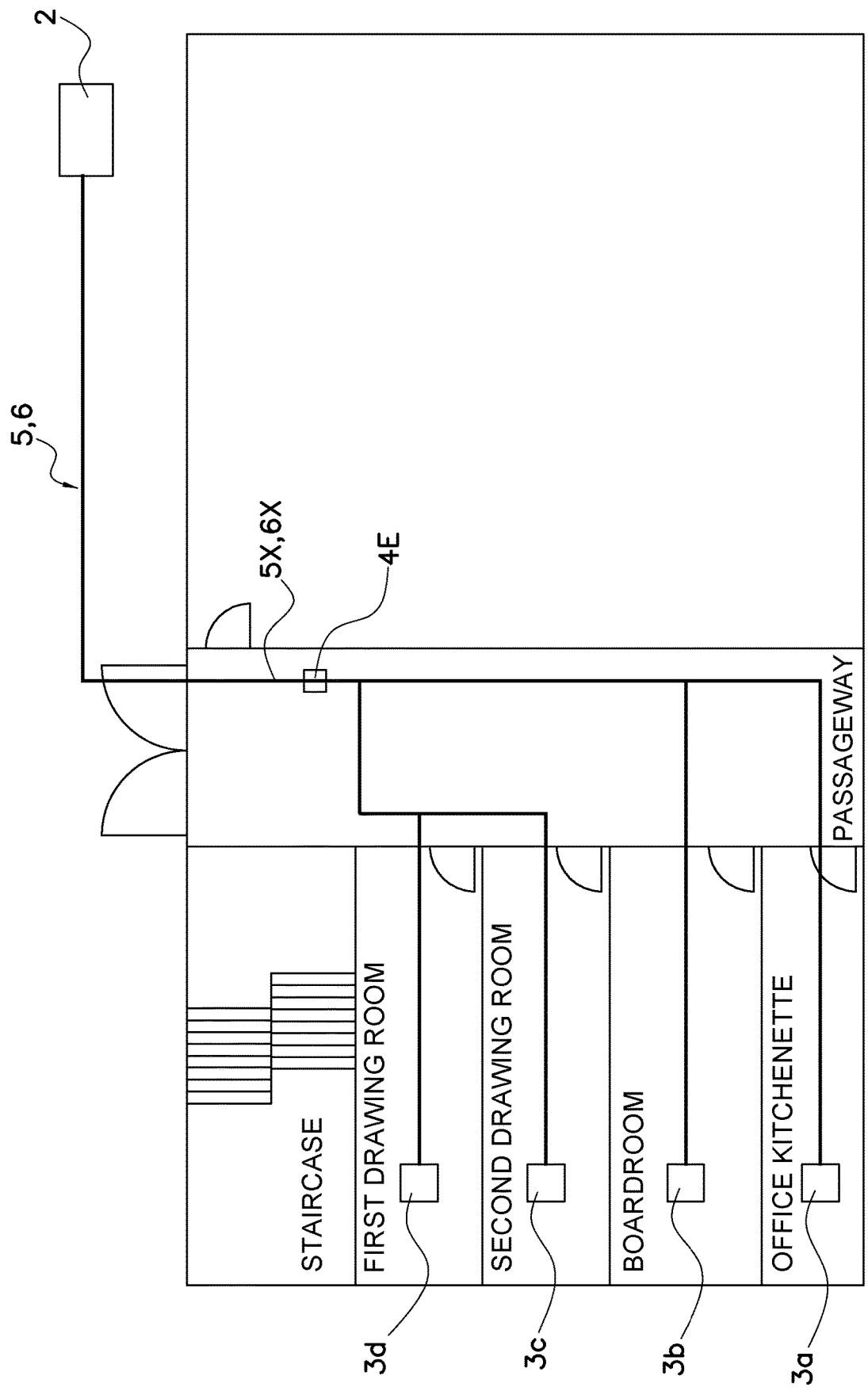
FIG. 3D is a diagram of exemplary arrangement D of the heat source-side unit, the utilization-side units, and a relay unit.
Figure 3E:
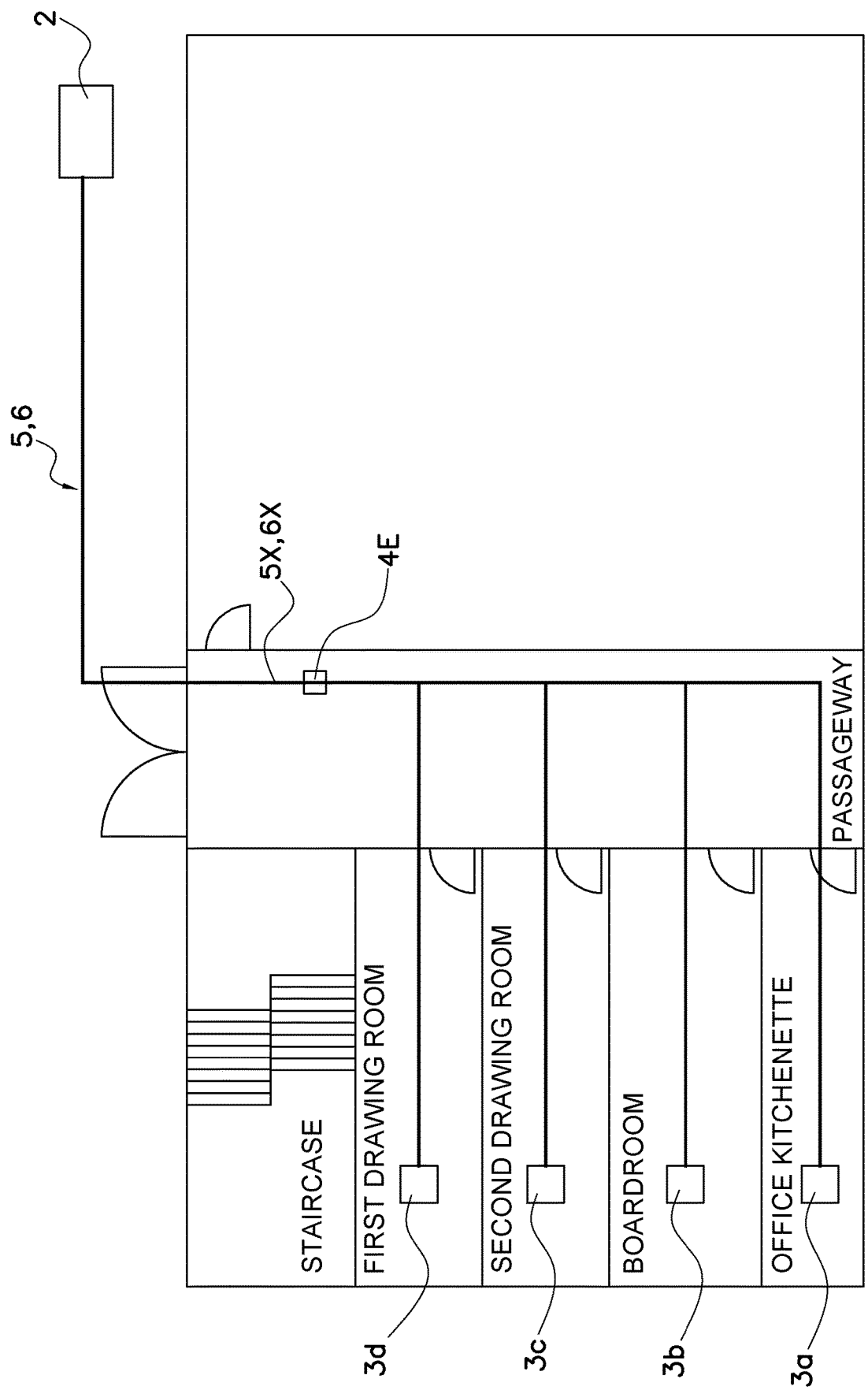
FIG. 3E is a diagram of exemplary arrangement E of the heat source-side unit, the utilization-side units, and the relay unit.

Therefore, if the concentration of the refrigerant that leaks into the small office kitchenette by the refrigerant amount Q exceeds the LFL/safety factor, it may be necessary to change the arrangement of the relay unit 4A as illustrated in FIG. 3B in order to reduce the refrigerant amount Q. If the concentration still exceeds the LFL/safety factor even after the change in arrangement of the relay unit 4A to the arrangement illustrated in FIG. 3B, it may be conceivable to deploy one relay unit 4D for the utilization-side unit 3a and to deploy one relay unit 4C for the remaining utilization-side units 3b, 3c, and 3d as illustrated in FIG. 3C. In contrast, it is assumed herein that the utilization-side units 3a, 3b, 3c, and 3d are installed in large rooms. In a case where all the refrigerant in the utilization-side units 3a, 3b, 3c, and 3d, the refrigerant in the first connection pipe group (5ab, 5a, 5b, 6ab, 6a, 6b), and the refrigerant in a second connection pipe group connecting the relay unit 4B and the utilization-side units 3c and 3d leak into one room (a room having the smallest floor area among the four rooms), if the concentration of the refrigerant in this room falls below the LFL/safety factor, it may be possible to achieve cost saving by installing one relay unit 4E functioning as a refrigerant shut-off unit as illustrated in FIGS. 3D and 3E. As described above, the arrangement of the relay unit is very important.

It should be noted that the relay units 4C, 4D, and 4E illustrated in FIGS. 3C to 3E are similar in configuration to the relay unit 4A described above.

(4-2) Arrangement of Relay Unit in Air Conditioning Apparatus According to One or More Embodiments As described above, particularly in the case of deploying one common relay unit for the plurality of utilization-side units, how to arrange the relay unit functioning as a refrigerant shut-off unit is very important in view of safety and cost. Heretofore, however, an experienced designer who is familiar with various refrigerant characteristics and laws and regulations has spent a lot of time to calculate arrangement of a refrigerant shut-off unit every time for each case.

In contrast, in the air conditioning apparatus 1 according to one or more embodiments, arrangement of a relay unit functioning as a refrigerant shut-off unit is fixed by a simple method. Specifically, for example, in fixing the arrangement of the relay unit 4A in the refrigerant system illustrated in FIG. 1, in a case where R32 is used as a refrigerant and a utilization-side unit is installed on the ceiling of a room, a restriction on a total value of the lengths of the pipes in the first connection pipe group (5ab, 5a, 5b, 6ab, 6a, 6b) is found in accordance with a table illustrated in FIG. 4, and the arrangement of the relay unit 4A is fixed within a range of the restriction. The table of FIG. 4 is prepared based on many pieces of data, including capacities of utilization-side units in air conditioning apparatuses that have been installed in various buildings in the past, floor areas of rooms, inner diameters of connection pipes, branching positions of connection pipes, and others. The table of FIG. 4 is prepared in such a way that when a restriction in the right column of the table is satisfied, a concentration of a refrigerant in a room at which leakage of the refrigerant occurs falls below an LFL/safety factor in all the past air conditioning apparatuses.

The table of FIG. 4 to be prepared differs depending on a refrigerant type and a ceiling height. Using this table, for example, even an air conditioning apparatus constructor, who is not an experienced designer, is able to fix arrangement of a relay unit in accordance with a total value of capacities of utilization-side units at a construction site. For example, when a total value of the capacities of the utilization-side units 3a and 3b in the first utilization-side unit group 81 is 11.6 kW, a restriction on a total value of the lengths of the pipes in the first connection pipe group (5ab, 5a, 5b, 6ab, 6a, 6b) is 40 m or less; therefore, the arrangement of the relay unit 4A can be fixed within a range of the restriction.

(4-3) Procedure of Fixing Arrangement of Relay Unit According to One or More Embodiments It can be said that a procedure of fixing the arrangement of the relay unit 4A includes the following steps in short, although the procedure has been described in the foregoing item (4-2).

A first step involves acquiring a capacity (kW) as information on the capability of each of the two utilization-side units 3a and 3b in the first utilization-side unit group 81. A second step involves finding a restriction on (i.e., an allowable maximum value of) the total value of the lengths of the pipes in the first connection pipe group (5ab, 5a, 5b, 6ab, 6a, 6b), based on the information acquired in the first step. A third step involves fixing the length of the first connection pipe group (5ab, 5a, 5b, 6ab, 6a, 6b), the length falling below the restriction found in the second step, and fixing the arrangement of the relay unit 4A.

(5) Features

The utilization-side unit 3a, the utilization-side unit 3b, the utilization-side unit 3c, and the utilization-side unit 3d of the air conditioning apparatus 1 including the refrigerant circuit 10 illustrated in FIG. 1 are respectively installed on the ceiling of the office kitchenette, the ceiling of the boardroom, the ceiling of the first drawing room, and the ceiling of the second drawing room as illustrated in FIG. 3A. In a case where the office kitchenette is the smallest one of the rooms, the arrangement of the relay unit 4A functioning as the refrigerant shut-off unit for the utilization-side units 3a and 3b is important from the viewpoint of safety upon leakage of the refrigerant.

According to one or more embodiments, the restriction on the total value of the lengths of the pipes in the first connection pipe group (5ab, 5a, 5b, 6ab, 6a, 6b) connecting the relay unit 4A including the liquid relay shut-off valve 41A and the gas relay shut-off valve 42A and the utilization-side units 3a and 3b is found from the table of FIG. 4. The two utilization-side units 3a and 3b located downstream of the relay unit 4A are referred herein to as the first utilization-side unit group 81 as illustrated in FIG. 3. In other words, the first connection pipe group (5ab, 5a, 5b, 6ab, 6a, 6b) connects the liquid connection pipe 61A and gas connection pipe 62A of the relay unit 4A to the utilization-side refrigerant circuits 13a and 13b in the first utilization-side unit group 81. As described above, a sum of the amount of the refrigerant in the first connection pipe group (5ab, 5a, 5b, 6ab, 6a, 6b) and the amount of the refrigerant in the utilization-side refrigerant circuits 13a and 13b of the utilization-side units 3a and 3b corresponds to a maximum value of the amount of the refrigerant that leaks into the space where the utilization-side unit 3a causing the leakage of the refrigerant is installed (i.e., the office kitchenette). The refrigerant amount Q as the maximum refrigerant leak amount is required to be smaller than the allowable refrigerant leak amount in the space where the utilization-side unit 3a is installed (i.e., the office kitchenette). Since the lengths of the pipes in the first connection pipe group (5ab, 5a, 5b, 6ab, 6a, 6b) are fixed in accordance with the table of FIG. 4, the refrigerant amount Q becomes smaller than the allowable refrigerant leak amount, so that safety is secured. In addition, the relay unit 4A is not necessarily disposed near the first utilization-side unit group 81 as long as the total value of the lengths of the pipes in the first connection pipe group (5ab, 5a, 5b, 6ab, 6a, 6b) falls within the range of the restriction found from the table of FIG. 4. As a result, the relay unit 4A may be disposed at a location away from the first utilization-side unit group 81 in consideration of maintainability.

As described above, in the air conditioning apparatus 1 according to one or more embodiments, the lengths of the pipes in the first connection pipe group (5ab, 5a, 5b, 6ab, 6a, 6b) are fixed based on the information (i.e., the capacities) on the capabilities of the utilization-side units 3a and 3b in the first utilization-side unit group 81. This configuration secures safety, and improves the degree of freedom as to the arrangement of the relay unit 4A.

(6) Modifications (6-1) Modification A

According to one or more embodiments, the air conditioning apparatus 1 fixes the restriction on the total value of the lengths of the pipes in the first connection pipe group (5ab, 5a, 5b, 6ab, 6a, 6b), based on the total value of the capacities (the total capacity) of the utilization-side units 3a and 3b in the first utilization-side unit group 81 downstream of the relay unit 4A, using the table of FIG. 4, thereby fixing the arrangement of the relay unit 4A.

The restriction on the total value of the lengths of the pipes in the first connection pipe group 5ab, 5a, 5b, 6ab, 6a, 6b, may alternatively be fixed using a table of FIG. 5 instead of the table of FIG. 4. In the table of FIG. 5, a combination pattern of the utilization-side units is determined from the capacities (kW) of the plurality of utilization-side units disposed downstream of the relay unit. For example, in a case where the capacity of the utilization-side unit 3a is 2.2 kW and the capacity of the utilization-side unit 3b is 2.8 kW, the corresponding combination pattern is No. 2 in FIG. 5. As a result, a restriction on the total value of the lengths of the pipes in the first connection pipe group 5ab, 5a, 5b, 6ab, 6a, 6b is fixed at 140 m or less. The table of FIG. 5 is prepared to secure safety as long as the arrangement of the relay unit 4A is fixed based on this restriction. The table of FIG. 5 is prepared as in the table of FIG. 4, based on many pieces of data, including capacities of utilization-side units in air conditioning apparatuses that have been installed in various buildings in the past, floor areas of rooms, inner diameters of connection pipes, branching positions of connection pipes, and others.

(6-2) Modification B

According to one or more embodiments, the air conditioning apparatus 1 fixes the restriction on the total value of the lengths of the pipes in the first connection pipe group 5ab, 5a, 5b, 6ab, 6a, 6b, based on the total value of the capacities (the total capacity) of the utilization-side units 3a and 3b in the first utilization-side unit group 81 downstream of the relay unit 4A, using the table of FIG. 4, thereby fixing the arrangement of the relay unit 4A.

In place of the table of FIG. 4, the restriction on the total value of the lengths of the pipes in the connection pipe group between the relay unit and the utilization-side units may be fixed based on the number of utilization-side units disposed downstream of the relay unit. The arrangement of the relay unit may alternatively be fixed as follows. For example, in a case where the number of utilization-side units is two, the restriction is fixed at 35 m or less. Alternatively, in a case where the number of utilization-side units is three or more, the restriction is fixed at 30 m or less. However, in a case where the restriction is fixed based on only the number of utilization-side units disposed downstream of the relay unit, the degree of freedom as to the arrangement of the relay unit 4A is relatively small.

(6-3) Modification C

According to one or more embodiments, the air conditioning apparatus 1 uses the table of FIG. 4 in which the floor areas of the rooms and the inner diameters of the connection pipes are previously estimated from the total value of the capacities (the total capacity) of the plurality of utilization-side units in the first utilization-side unit group downstream of the relay unit, based on the past data. However, the table of FIG. 4 is merely an example. The table may alternatively be prepared for each range of a floor area so as to present a floor area of a room having the smallest floor area among the utilization-side unit installation spaces. Still alternatively, a plurality of tables may be prepared in accordance with the sizes of the connection pipes. In these cases, it can be expected that the restriction on the total value of the lengths of the pipes in the connection pipe group between the relay unit and the utilization-side units is loosened, leading to further improvement in degree of freedom as to the arrangement of the relay unit 4A.

(6-4) Modification D

According to one or more embodiments, the air conditioning apparatus 1 fixes the restriction on the total value of the lengths of the pipes in the first connection pipe group (5ab, 5a, 5b, 6ab, 6a, 6b), based on the total value of the capacities (the total capacity) of the utilization-side units 3a and 3b in the first utilization-side unit group 81 downstream of the relay unit 4A, using the table of FIG. 4, thereby fixing the arrangement of the relay unit 4A.

However, the table of FIG. 4 is merely an example. The table of FIG. 4 may include on its right column a restriction on a total value of internal volumes of the pipes in the connection pipe group downstream of the relay unit. A change in arrangement of the relay unit leads to changes in path and length of the connection pipe group, resulting in a change in internal volume. When a restriction on the internal volume is found, the arrangement of the relay unit is fixed within a range of the restriction.

(6-5) Modification E

According to one or more embodiments, each of the liquid relay shut-off valve 41A, the liquid relay shut-off valve 41B, the gas relay shut-off valve 42A, and the gas relay shut-off valve 42B in the air conditioning apparatus 1 is an electric expansion valve, but may alternatively be an electromagnetic valve that switches between an open state and a closed state.

(6-6) Modification F

According to one or more embodiments, the air conditioning apparatus 1 includes the relay units 4A and 4B each having the liquid-side configuration and the gas-side configuration. The air conditioning apparatus 1 may alternatively include a relay unit having the liquid-side configuration and a relay unit having the gas-side configuration.

(6-7) Modification G

According to one or more embodiments, the refrigerant circuit 10 in the air conditioning apparatus 1 is filled with R32 as a refrigerant. However, the technique regarding the arrangement of the relay unit described above is also effective in a case where the refrigerant circuit 10 is filled with another flammable refrigerant. The technique regarding the arrangement of the relay unit described above is also effective in a case where the refrigerant circuit 10 is filled with a single refrigerant of a mildly flammable refrigerant such as R32, R1234yf, R1234ze, or R744, or a mixed refrigerant containing this refrigerant. It should be noted that R32 is difluoromethane (HFC-32), R1234yf is 2,3,3,3-tetrafluoro-1-propene (HFO-1234yf), R1234ze is 1,3,3,3-tetrafluoro-1-propene (HFO-1234ze), and R744 is carbon dioxide.

A mildly flammable refrigerant, a lower flammability refrigerant, or a higher flammability refrigerant is supposed to be used as a refrigerant with which the refrigerant circuit 10 is filled and which flows through the refrigerant circuit 10. The mildly flammable refrigerant is classified as "Class 2L" in U.S. ANSI/ASHRAE Standard 34-2013. The lower flammability refrigerant is classified as "Class 2" in U.S. ANSI/ASHRAE Standard 34-2013. The higher flammability refrigerant is classified as "Class 3" in U.S. ANSI/ASHRAE Standard 34-2013.

U.S. ANSI/ASHRAE Standard 34-2013 is a standard of criteria for evaluation of flammable gas in the United States of America. Regulations on chemical materials are established in various countries around the world, and one of the regulations is the flammability of chemical materials. A standard is established for each country, and gas is classified into flammable gas and non-flammable gas under the criteria for evaluation in each country. In Japan, High Pressure Gas Safety Act defines an explosion limit value as one of criteria of flammable gas. Examples of the criteria of flammable gas may include ASHRAE34 and DOT as U.S. standards, EN378-1 and CLP Regulation as European standards, and GHS and ISO10156 as international standards. A European standard equivalent to U.S. ANSI/ASHRAE Standard 34-2013 is, for example, DIN EN378-1 (2008). DIN EN378-1 (2008) also specifies "Class 3: Higher Flammability", "Class 2: Lower Flammability", and "Class 2L: Mildly Flammable" as in U.S. ANSI/ASHRAE Standard 34-2013. Likewise, ISO/Final Draft International Standard (FDIS) 817 (2013) specifies "Class 3: Higher Flammability", "Class 2: Lower Flammability", and "Subclass 2L: Mildly Flammable".

(6-8) Modification H

According to one or more embodiments, the control unit 19 of the air conditioning apparatus 1 has the configuration in which the heat source-side control unit 92, the relay-side control units 94A and 94B, and the utilization-side control units 93a, 93b, 93c, and 93d are connected via the transmission lines 95 and 96 as illustrated in FIG. 2A.

Figure 6:
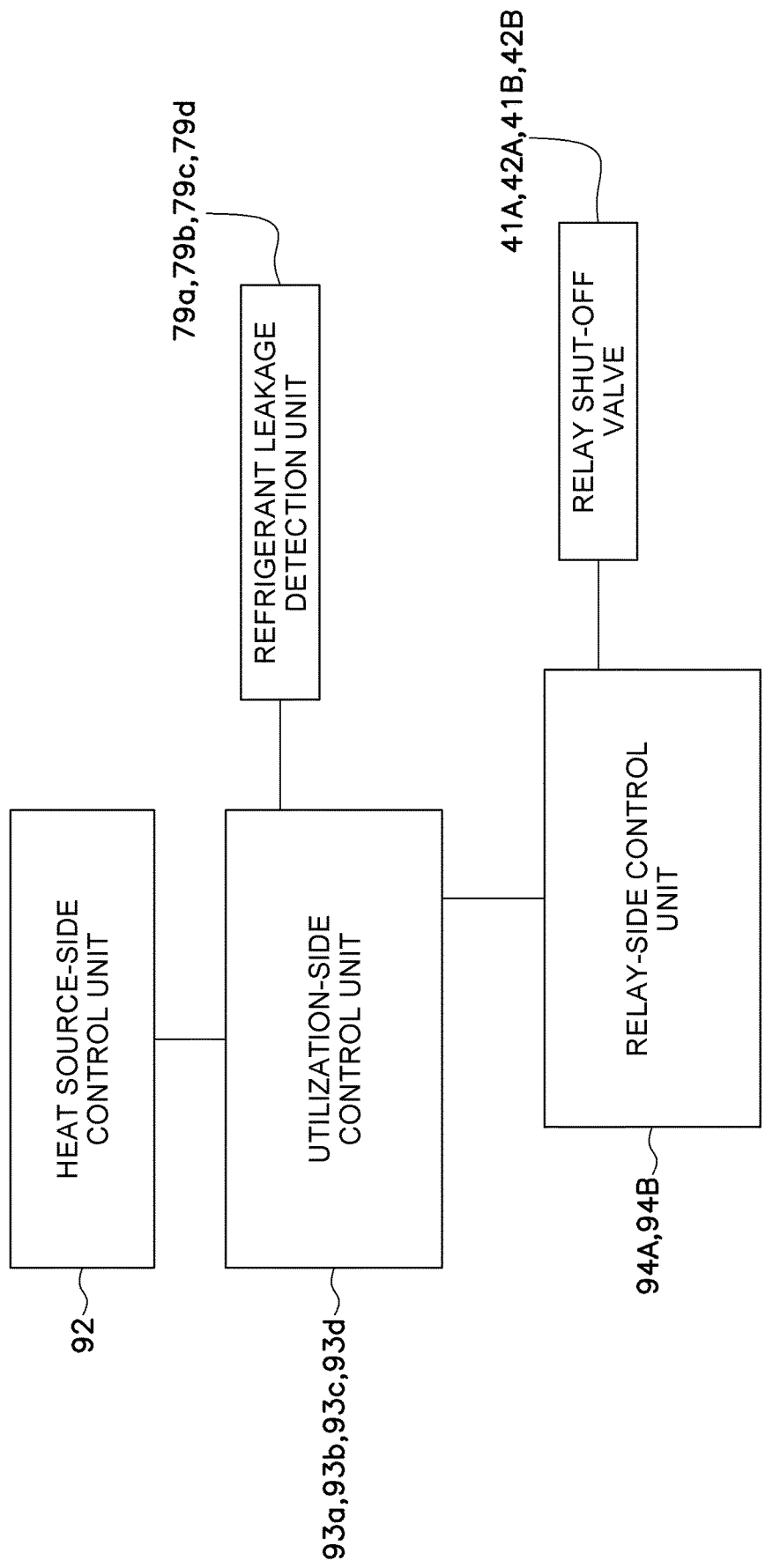
FIG. 6 is a control block diagram of a control unit in an air conditioning apparatus according to Modification H.

The control unit 19 may alternatively employ a configuration in which the heat source-side control unit 92 and the relay-side control units 94A and 94B are connected via the utilization-side control units 93a, 93b, 93c, and 93d as illustrated in FIG. 6, in place of the configuration in which the heat source-side control unit 92 and the utilization-side control units 93a, 93b, 93c, and 93d are connected via the relay-side control units 94A and 94B as illustrated in FIG. 2A.

(6-9) Modification I

While various embodiments of the present disclosure have been described herein above, it is to be appreciated that various changes in form and detail may be made without departing from the spirit and scope of the present disclosure presently or hereafter claimed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

2: heat source-side unit
3a, 3b, 3c, 3d: utilization-side unit
4A: first refrigerant shut-off unit (refrigerant shut-off unit)
5, 6: refrigerant connection pipe group
5ab, 5a, 5b: liquid-side first connection pipe group (first connection pipe group)
6ab, 6a, 6b: gas-side first connection pipe group (first connection pipe group)
12: second refrigerant circuit
13a, 13b, 13c, 13d: first refrigerant circuit
41A: liquid-side first refrigerant shut-off valve
42A: gas-side first refrigerant shut-off valve

The invention claimed is:

1. A method for disposing a refrigerant shut-off unit in a refrigerant cycle system, wherein the refrigerant cycle system comprises:

a utilization-side unit group comprising N utilization-side units, wherein N is an integer equal to or greater than two, and each of the utilization-side units comprises a first refrigerant circuit;

a heat source-side unit comprising a second refrigerant circuit;

a refrigerant shut-off unit configured to block a flow of refrigerant between one of the first refrigerant circuits and the second refrigerant circuit; and a connection pipe group that:
connects the first refrigerant circuits and the second refrigerant circuit, and comprises a pipe that connects the one of the first refrigerant circuits and the refrigerant shut-off unit, the refrigerant flowing through the first refrigerant circuits, the second refrigerant circuit, and the connection pipe group is flammable, the method comprising:
acquiring information on capabilities of the N utilization-side units;

determining an allowable maximum value of one or both of a length and an internal volume of the pipe, based on the information;

determining a position of the refrigerant shut-off unit in the connection pipe group such that the one or both of the length and the internal volume of the pipe fall below the allowable maximum value, and installing the refrigerant shut-off unit in the connection pipe group at the position.

2. The method according to claim 1, wherein
the refrigerant flowing through the first refrigerant circuit, the second refrigerant circuit, and the connection pipe group is:
a mildly flammable refrigerant classified as "Class 2L" in U.S. ANSI/ASHRAE Standard 34-2013;
a lower flammability refrigerant classified as "Class 2" in U.S. ANSI/ASHRAE Standard 34-2013; or
a higher flammability refrigerant classified as "Class 3" in U.S. ANSI/ASHRAE Standard 34-2013.

3. The method according to claim 1, wherein
the connection pipe group comprises:
a gas-side connection pipe group through which the refrigerant in gas phase flows, and
a liquid-side connection pipe group through which the refrigerant in liquid phase flows, and
the refrigerant shut-off unit comprises:
a gas-side refrigerant shut-off valve disposed on a refrigerant circuit-side end of the gas-side connection pipe group, and
a liquid-side refrigerant shut-off valve disposed on a refrigerant circuit-side end of the liquid-side connection pipe group.

4. The method according to claim 1, wherein the information on the capabilities of the N utilization-side units contains at least one of:
the number N of the utilization-side units,
a total capacity as a total value of capacities of the utilization-side units, and
a combination pattern of the capacities of the utilization-side units.

5. The method according to claim 1, wherein
a length of the connection pipe group is fixed based on:
the information on the capabilities of the N utilization-side units, and
a pipe diameter of the connection pipe group.

* * * * *